US006362311B1

(12) United States Patent
Highsmith et al.

(10) Patent No.: US 6,362,311 B1
(45) Date of Patent: Mar. 26, 2002

(54) POLYMERIZATION OF POLY(GLYCIDYL NITRATE) FROM HIGH PURITY GLYCIDYL NITRATE SYNTHESIZED FROM GLYCEROL

(75) Inventors: Thomas K. Highsmith; Andrew J. Sanderson; Louis F. Cannizzo, all of North Ogden; Robert M. Hajik, Willard, all of UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/688,819

(22) Filed: Oct. 17, 2000

Related U.S. Application Data

(60) Provisional application No. 60/160,207, filed on Oct. 19, 1999.

(51) Int. Cl.$^7$ .......................... C08G 59/68; C08G 65/04
(52) U.S. Cl. ....................... 528/409; 528/408; 528/403; 528/420; 528/482; 528/485; 528/489; 525/333.1; 549/512; 549/513
(58) Field of Search ................................. 528/409, 408, 528/403, 420, 82, 485, 489; 525/333.1; 549/512, 513

(56) References Cited

U.S. PATENT DOCUMENTS

| | | |
|---|---|---|
| 2,139,364 A | 12/1938 | Groll |
| 2,198,367 A | 4/1940 | Jacobi et al. |
| 2,242,485 A | 5/1941 | Stein |
| 3,557,181 A | 1/1971 | Lakritz et al. |
| 4,000,179 A | 12/1976 | Ayerst |
| 4,251,455 A | 2/1981 | Gebauer |
| 4,853,157 A | 8/1989 | Stiff |
| 5,089,652 A | 2/1992 | Sohara et al. |
| 5,120,827 A | 6/1992 | Willer et al. |
| 5,136,062 A | 8/1992 | Millar et al. |
| 5,145,974 A | 9/1992 | Paul et al. |
| 5,162,494 A | 11/1992 | Willer et al. |
| 5,264,596 A | 11/1993 | Willer et al. |
| 5,313,000 A | 5/1994 | Stewart |
| 5,380,777 A | 1/1995 | Willer et al. |
| 5,587,553 A | 12/1996 | Braithwaite et al. |
| 5,591,936 A | 1/1997 | Willer et al. |
| 5,605,975 A | 2/1997 | Ahad |
| 5,801,325 A | 9/1998 | Willer et al. |

OTHER PUBLICATIONS

Chemistry and Technology of Explosives, vol. II, Tadeusz Urbanski, Pergamon Press, 1965, pp. 128–133, 140.
"Dependence of the Equilibrium Constants of Nitration Reactions on the Temperature,Acidity of the Medium, and Structure of the Nitrated Compound," Kazakov et al., Bulletin of the Russian Chemical Society, 90 (1991),pp. 1560–1565.
"Changes in ΔH and ΔS in the Nitration Reaction," Kazakov et al., Bulletin of the Russian Chemical Society, 90 (1991), pp. 1565–1570.
Chemistry and Technology of Explosives, vol. 4, by Tadeusz Urbanski, Pergamon Press (1964), pp. 419, 421.
The Chemistry of Powder and Explosives, Tenney L. Davis, Ph.D., John Wiley & Sons, New York (1947), pp. 214–223.
Encyclopedia of Explosives and Related Items, Patr 2700, vol. 6, Federoff & Sheffield, Picatinny Arsenal, Dover, NJ (1974), pp. G97–G98, G110.
Patent Abstracts of Japan & JP 55 099960A (Nippoon Oil and Fats Co. Ltd), Jul. 30, 1980.
Diitroglycerin, Chem. Bericht, vol. 41, No. 1, pp. 1115–1117, XP–002158391 (1908).
Capello, C., et al., Kinetic Studies and Product Characterization During the Basic Hydrolysis of Glyceryl Nitrate Esters, American Chemical Society, Abstract No. 1980:425488, XP–002158392 (1980).

*Primary Examiner*—Duc Truong
(74) *Attorney, Agent, or Firm*—Sullivan Law Group

(57) ABSTRACT

Glycerol is nitrated with at least one nitrating source in a solvent to form a nitrated glycerol solution containing dinitroglycerin. The nitrated glycerol solution is treated with at least one cyclizing agent to convert the dinitroglycerin into glycidyl nitrate, which is polymerized into poly (glycidyl nitrate) (PGN). Distillation or other vaporization techniques are not required to remove nitroglycerin from the glycidyl nitrate prior to polymerization of the glycidyl nitrate. Rather, the nitroglycerin can be carried along with the dinitroglycerin during polymerization. As a consequence, the glycidyl nitrate is not exposed to elevated temperatures sufficient to cause accidental explosion or deflagration of the nitrate ester. Still more preferably, the glycidyl nitrate is not heated above room temperature at any time prior to polymerization. Moreover, given the high energy performance of nitroglycerin, the nitroglycerin can optionally be retained with the PGN, i.e., not washed out, for subsequent processing and end use.

19 Claims, No Drawings

US 6,362,311 B1

POLYMERIZATION OF POLY(GLYCIDYL NITRATE) FROM HIGH PURITY GLYCIDYL NITRATE SYNTHESIZED FROM GLYCEROL

RELATED APPLICATIONS

Priority is claimed of provisional application No. 60/160,207 filed in the U.S. Patent & Trademark Office on Oct. 19, 1999. The complete disclosure of the provisional application is incorporated herein by reference.

BACKGROUND OF THE INVENTION

1. Field of the Invention

This invention is directed to a novel method of polymerizing poly(glycidyl nitrate) from high purity glycidyl nitrate synthesized from glycerol. This invention is also directed to methods for making explosive compounds, pyrotechnics, and solid propellants comprising poly(glycidyl nitrate) elastomer binders.

2. Description of the Related Art

Solid high energy compositions, such as propellants, explosives, gasifiers, or the like, generally comprise solid particulates, such as fuel particulates and/or oxidizer particulates, dispersed and immobilized throughout a binder matrix comprising an elastomeric binder.

In recent years, energetic polymers have been developed and evaluated as replacements of inert polymer binders in cast propellant systems, explosive compositions, and pyrotechnics. The substitution of an energetic polymer for an inert polymer in a typical pressable or extrudable explosive composition increases the detonation pressures and detonation velocities of the explosive. In this regard, much recent work has centered on attempts to produce acceptable energetic polyoxetanes and glycidyl azide polymer (GAP).

A problem with elastomeric binders formed from polyoxetanes is their relatively low oxygen balance. Also, it has been reported that polyoxetanes tend to have mechanical characteristics less than that which is desirable for some high energy applications, particularly for a rocket motor propellant.

Due to safety and toxicity concerns that arise during processing of glycidyl azide monomer, GAP is commonly synthesized by polymerizing epichlorohydrin (rather than glyciyl azide) to form poly(epichlorohydrin). The chlorine substituents are then displaced by reaction with sodium azide in dimethylsulfoxide. Thus, the desire to avoid the direct polymerization of glycidyl azide complicates the GAP synthesis route. Moreover, the resulting polymers have been reported as being characterized by low molecular weights and amorphous structures.

Poly(glycidyl nitrate) (PGN) has been known and recognized as a possible energetic polymer suitable for use in propellants, explosives, gas generants, pyrotechnics, and the like. PGN is most commonly synthesized in the industry by a three-step procedure characterized by a first step in which epichlorohydrin is nitrated, and a second step in which the nitrated epichlorohydrin is recyclizated with a base to form glycidyl nitrate. The glycidyl nitrate is then polymerized in a third step by cationic polymerization to form PGN. The selection of epichlorohydrin derives from the low cost of the reagent and the relatively high nitration yields obtained by the nitration of epichlorohydrin. Despite these relatively high nitration yields, in the subsequent recyclization step an appreciable amount of epichlorohydrin is regenerated with the glycidyl nitrate. The presence of epichlorohydrin during subsequent cationic polymerization is highly disadvantageous, since the epichlorohydrin, unless removed, will copolymerize with the glycidyl nitrate to decrease the nitro group concentration of the resulting copolymer. As a consequence of the incorporation of the epichlorohydrin into the copolymer, a substantially lower energetic characteristic is attained than had epichlorohydrin not participated in the polymerization reaction. In order to increase purity of the monomer to an acceptable level for polymerization of PGN, the epichlorohydrin is distilled from the glycidyl nitrate prior to polymerization. However, because glycidyl nitrate is a primary nitrate ester and thus highly explosive, distillation of glycidyl nitrate in unsafe and unduly expensive for large scale operations.

Another known, yet less utilized process for making PGN resides in treating glycidol with nitrogen pentoxide $N_2O_5$ in an inert solvent, then quenching the reaction mixture in aqueous solution, as discussed in U.S. Pat. No. 5,136,062 to Millar et al. However, as generally acknowledged in the art and taught by Millar et al., in this reaction sequence glycidol is commonly distilled prior to its nitration reaction. If the glycidol is not distilled, then glycidol oligomers will be present in the nitrated product, and will interfere with the polymerization reaction. Moreover, even when distillation is performed, there is a potential for thermally initiated autopolymerization of the undistilled glycidol unless the glycidol is distilled under vacuum at a relatively low temperature prior to nitration.

Thus, although it has been long recognized that PGN is an excellent energetic polymer candidate for such applications as propellants, explosives, and pyrotechnics, a need persists in the art for a low cost and non-hazardous synthesis route that produces glycidyl nitrate of adequate purity and sufficiently low moisture contamination to permit effective polymerization without distillation or other elevated temperature purification of the glycidyl nitrate or glycidyl nitrate precursor.

SUMMARY OF THE INVENTION

It is, therefore, an object of this invention to fulfill the long-felt need in the art outlined above by providing a method of synthesizing PGN from a glycidyl nitrate monomer precursor in which neither the glycidyl nitrate monomer precursor nor the glycidyl nitrate monomer must be subject to distillation or other elevated temperature purification prior to polymerizing the glycidyl nitrate monomer to PGN.

In accordance with the principles of this invention, the above and other objects are attained by a process comprising nitrating glycerol with at least one nitrating source in a solvent to form a nitrated glycerol solution comprising dinitroglycerin, treating the nitrated glycerol solution with at least one cyclizing agent to convert the dinitroglycerin into glycidyl nitrate, and polymerizing the glycidyl nitrate into poly(glycidyl nitrate).

One of the main advantages of this invention is the circumvention of the need for distillation or other vaporization techniques to remove nitroglycerin prior to polymerization of the glycidyl nitrate. Rather, the nitroglycerin can be carried along with the dinitroglycerin during polymerization, thus significantly reducing production and labor costs. In this manner, the glycidyl nitrate is not exposed to elevated temperatures sufficient to cause accidental explosion or deflagration of the nitrate ester. Still more preferably, the glycidyl nitrate is not heated above room temperature at any time prior to polymerization. Moreover, given the high energy performance of nitroglycerin, the nitroglycerin can optionally be retained with the PGN, i.e., not washed out, for subsequent processing and end use.

Other objects, aspects and advantages of the invention will be apparent to those skilled in the art upon reading the specification and appended claims which explain the principles of this invention.

DETAILED DESCRIPTION OF THE INVENTION

It is generally known in the art that glycidyl nitrate can be hydrolyzed from dinitroglycerin, which in turn can be synthesized by the nitration of glycerol $CH_2(OH)CH(OH)CH_2(OH)$ (also known and referred to herein as glycerin), as proposed by T. Davis, The Chemistry of Powder and Explosive (J. Wiley & Sons, Inc. 1943), the complete disclose of which is incorporated herein by reference. Preferably, the nitration of glycerol is performed with nitric acid as the nitrating agent. Another one of the advantages of this invention is that it is not necessary to use industrial grade pure nitric acid, i.e., 98–100 wt %; rather, 90 wt % nitric acid is suitable for this invention. It is also within the scope of this invention to use other nitrating agents, such as the following: mixed acids, such as sulfuric and nitric acids, or acetyl nitrate; nitronium ion salts, such as $NO_2BF_4$, $NO_2ClO_4$, and/or $N_2O_5$; and trifluoroacetic anhydride (TFAA) with ammonium nitrate, nitric acid, and/or Crivello reagents. The molar ratio of nitrating agent to glycerol is preferably in a range of from about 4:1 to about 5:1.

The nitration of glycerol produces the five different compounds: trinitroglycerin (or nitroglycerin), two isomers of mononitroglycerin, and another two isomers of dinitroglycerin:

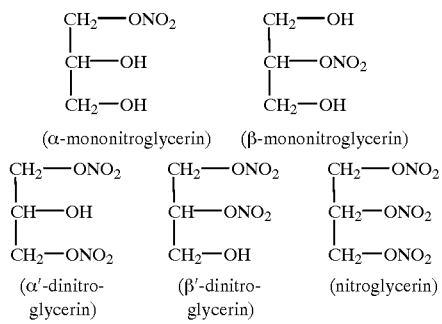

The cyclization of the dinitroglycerin into glycidyl nitrate is performed in the presence of an inorganic hydroxide, including alkali metal hydroxides such as sodium hydroxide, potassium hydroxide, and lithium hydroxide. Alkaline earth metals, and in particular calcium hydroxide, can also be used. Generally, two molar equivalents of cyclizing agent may be used: the first equivalent for neutralizing the nitric acid, and the second equivalent for cyclization. Although hydrolysis treatment of the nitrated glycerol solution in an alkaline environment converts the dinitroglycerin isomers into glycidyl nitrate, the two mononitroglycerin isomers and the trinitroglycerin do not cyclize into glycidyl nitrate. Rather, the mononitroglycerin isomers are hydrolyzed, becoming immiscible with the glycidyl nitrate and the nitroglycerin, and can be removed, separated, or recovered (e.g., by decanting) from the reaction solution at or below room temperature by decanting or the like.

To the surprise of the inventors, it was found that the polymerization of glycidyl nitrate into PGN can be conducted in the presence of the trinitroglycerin without distilling off the nitroglycerin or otherwise purifying the reaction solution of nitroglycerin via vaporization, since the nitroglycerin does not interfere with the polymerization of glycidyl nitrate.

In order to increase the yield of glycidyl nitrate from the glycerol, reaction conditions can be and preferably are selected to drive the synthesis of 1,3-dinitroglycerin. Preferably, the nitration reaction is conducted at a relatively low temperature not higher than room temperature, still preferably 0–25° C., and still more preferably 10–20° C. The reaction typically requires at least about 4 hours, more commonly a minimal of about 6 hours, due to the low temperature at which the nitration reaction proceeds. Practice of these conditions can result in a dinitroglycerin concentration of at least 50 mol %, with trinitroglycerin being present in concentrations of less than about 20 mol %, still more preferably less than about 10 mol %, to satisfy safety concerns.

The nitration step is preferably conducted in the presence of an acceptable heat sink medium, such as an inert halogenated hydrocarbon, such as methylene chloride, chloroform, and/or dichloroethane.

Polymerization of the glycidyl nitrate occurs as follows:

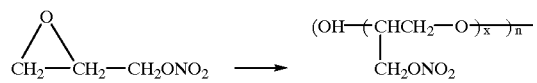

wherein n is an integer essentially equal to the hydroxy functionality of a polyol co-initiator and x is an integer representing the repeating units, by forming a catalyst-initiator complex and reacting the complex with glycidyl nitrate and wherein the ratio of mols catalysts/mols hydroxyls in the initiator is about 0.5:1. The glycidyl nitrate monomer is added to the catalyst-initiator complex reaction mixture at a rate in which the monomer is used up (reacted) essentially as fast as it is added, and the reaction temperature is preferably maintained at a temperature within the range of from about 10° C. to about 25° C.

The polymerization reaction is a cationic polymerization process conducted using a polyol co-initiator and an acid catalyst. The acid catalyst may be selected from among protic and Lewis acids known in the art, including $BF_3$, $HBF_4$, $PF_5$, $BF_3$:THF, $BF_3$ etherate, as well as other initiators such as triethoxonium salts, such as triethyloxonium hexafluorophosphate, triethoxonium hexafluoroantimonate, and triethoxonium tetrafluoroborate. The polyol co-initiator forms a preinitiator complex with the polyol, for example, butanediol is known to form a complex with boron trifluoride ($BF_3$). The complete disclosure of U.S. regular patent application Ser. No. 08/233,219, which describes polymerization with triethoxonium salts, is hereby incorporated herein by reference.

The polyol initiator employed generally has sterically unhindered hydroxyl groups. The polyol is preferably a diol, although triols and tetrols can also be used. Suitable diols include, but are not limited to, ethylene glycol, propylene glycol, 1,3-propanediol and 1,4-butanediol. Suitable triols include, but are not limited to, glycerol, trimethylolpropane, and 1,2,4-butanetriol. A suitable tetrol is, but is not limited to, 2,2'-dihydroxylmethyl-1,3-propanediol. The molecular weight of the polyol is relatively low, preferably less than 500, more preferably below 300 and most preferably below about 150.

The acid catalyst is used at a low level relative to hydroxyl groups of the polyol. A much more controlled reaction occurs if the catalyst, such as a Lewis acid, is used at a molar ratio relative to hydroxyl groups of the polyol of less than 1:1, preferably from about 0.4:1 to about 0.8:1. If a protic acid is used as the catalyst, the ratio of hydrogen ions released by the acid catalyst to the hydroxyl groups of the alcohol is also less than 1:1, preferably 0.4:1 to about 0.8:1. By using a substantially lower level of acid catalyst, incorporation of a greater percentage of the polyol moieties internally within polymer molecules is achieved, cyclic oligomer formation is suppressed to a level of about 2 to 5% or less, and lower polydispersity ($M_w/M_n$) of less than 2 is achieved. As referred to herein, polydispersity is measured by GPC (gel permeation chromatography).

The cationic polymerization reaction may be carried out in a suitable organic solvent conducive to the cationic polymerization. If a solvent is employed, such suitable solvent is a non-protic, non-ether, inert solvent. Such solvents include, but are not limited to, halogenated hydrocarbon solvents, such as methylene chloride, chloroform, and 1,2-dichloroethane.

The polymerization reaction is conducted in a manner whereby the glycidyl nitrate is combined with the reaction mixture at a rate essentially equivalent to its rate of reaction, so that no effective net concentration of monomer is built up in the reaction mixture and the reaction temperature is maintained at a temperature within the range of from about 10° C. to about 25° C., preferably from about 11° C. to about 17° C., and still more preferably about 13° C. to about 15° C.

When the reaction of catalyst and initiator results in the formation of alkoxide groups in the catalyst-initiator complex, such as for example, the presence of alkoxide group compounds in the reaction mixture formed by the reaction of boron trifluoride etherate and 1,4-butanediol (or other monoalcohol, diol, or polyol), the resulting PGN products are low in functionality. Pre-reacting the polyol 1,4-butanediol and boron trifluoride etherate and then optionally removing diethylether under vacuum conditions produces a PGN product essentially free of alkoxide groups. If, however, the catalyst and initiator would not form products containing such alkoxide groups, such as when boron trifluoride gas is employed instead of boron trifluoride etherate, then prereaction of the catalyst and initiator and removal of potential alkoxide compounds is not necessary.

A more detailed discussion of technique for polymerizing glycidyl nitrate into poly(glycidyl nitrate) is disclosed in U.S. Pat. No. 5,120,827, the complete disclosure of which is incorporated herein by reference.

The PGN as obtained can be utilized in explosive compositions without the need for further purification or recrystallization steps. However, after quenching of the PGN with, for example, methanol, it is within the scope of this patent to purify the PGN by removing the residual nitroglycerin, although retention of the nitroglycerin may be desirable for some end applications.

PGN may be used in combination with conventional or novel propellant and solid explosive ingredients as the basis for formulating very high performance insensitive propellant and explosive compositions. Propellant and explosive compositions suitable for use with PGN are taught in U.S. Pat. No. 5,587,553 and U.S. Pat. No. 5,690,868, the complete disclosures of which are incorporated herein by reference.

Representative explosive materials that can be made with PGN, as the sole binder or one of a plurality of binders, include gun propellants, cast cure explosives, and extruable explosives.

Generally, gun propellants comprise about 15 wt % to about 40 wt % of binder and plasticizer (at a plasticizer to binder weight ratio of 0:1 to 3:1), 0–80 wt % filler, such as nitramine (e.g., RDX and/or HMX), and optionally 0.5 wt % to 5 wt % ballistic modifiers.

Cast cure explosives in which PGN may be used generally comprise as ingredients 5–20 wt % of PGN and optionally one or more binders, 0.5–3 wt % of one or more curatives, 0.25–2 wt % of one or more cure catalysts, and 20–80 wt % of one or more oxidizers, which may include ammonium perchlorate, ammonium nitrate, and nitramines such as HDX or RDX.

Typical formulations for extrudable explosives include 5–35 wt % of PGN and optionally one or more thermoplastic elastomers, 0–65 wt % of one or more oxidizers, 0–90 wt % of one or more explosive fillers such as nitramines, 0–40 wt % of metals, and 0–25 wt % of one or more plasticizers.

PGN may also be used in conjunction with the preparation of composite propellant formulations, including minimum smoke, reduced smoke, and smokey propellants.

Minimum smoke propellants generally include as ingredients the following: 4–30 wt % of binder, 0.5–3 wt % of one or more curatives, 0.25–2 wt % of one or more cure catalysts, 40–80 wt % oxidizers, 0–50 wt % of energetic solid fuels such as nitramines, and 0–30 wt % of one or more other plasticizers. Other additives, such as 0–5 wt % ballistic modifiers, may also be added.

Typical formulations for the reduced smoke propellants generally are similar to minimum smoke propellants. However, if ammonium perchlorate is selected as a component of the oxidizer and/or aluminum or aluminum oxide is selected as a component of the fuel, the ammonium perchlorate and aluminum are used in sufficiently low amounts to retain the desired reduced smoke properties. Generally, ammonium perchlorate is present in an amount of not more than 90 wt % and aluminum is present in an amount of not more than 3 wt % for reduced smoke propellants.

Typical formulations for the smokey propellants generally are similar to those of reduced smoke propellants, but do not contain undue restrictions on the smoke generating components, so that aluminum can be used in concentrations as high as about 22 wt % (as limited by combustion efficiency) and the ammonium perchlorate can be used in concentrations as high as about 80 wt % (as limited by theoretical performance).

Methods of preparing energetic formulations are generally known in the art, and are set forth in A. Davenas, Solid Rocket Propulsion Technology (1993) and R. Meyer, Explosives ($4^{th}$ ed. 1993).

The binders can be energetic, inert, or a combination (e.g., mixture, copolymer or terpolymer) thereof Representative inert polymeric binders that can be used singly or in combination with PGN include HTPB (hydroxy-terminated polybutadiene), PBAN (butadiene-acrylonitrile-acrylic acid terpolymer), PPG (polypropylene glycol), PEG (polyethylene glycol), polyesters, polyacrylates, polymethacrylates, CAB (cellulose acetate butyrate), or mixtures and copolymers thereof Representative energetic polymeric binders that can be used singly or in combination with PGN include poly-NMMO (poly(nitratomethyl-methyloxetane)), GAP (polyglycidyl azide), 9DT-NIDA (diethyleneglycol-triethyleneglycol-nitraminodiacetic acid terpolymer), poly-BAMO (poly(bisazidomethyloxetane)), poly-AMMO (poly(azidomethylmethyloxetane)), poly-NAMMO (poly(nitraminomethyl-methyloxetane)), copolyBAMO/NMMO, BAMO/AMMO, or mixtures and copolymers thereof, with PGN and GAP being preferred.

The binder can optionally be halogenated, such as fluorinated ethylene propylene copolymer, chlorotrifluoroethylene and vinylidene fluoride copolymer, polyvinylidene fluoride, polydifluorochloroethylene, fluorinated polyethers, PVC, polytetrafluoroethylene, or mixtures thereof.

Representative oxidizers include AP (ammonium perchlorate), AN (ammonium nitrate), HAN (hydroxylammonium nitrate), ADN (ammonium dinitramide), HNF (hydrazinium nitroformate) or mixtures thereof, as well as the nitramines mentioned below.

Representative reactive metals include aluminum, magnesium, boron, titanium, zirconium, or mixtures thereof. The metals may be present as a powder, particles, and/or in other forms.

Energetic solid fuels (for propellants) or explosive fill (for explosives) that can be used in combination with PGN include the following: TEX (4,10-dinitro-2,6,8,12-tetraoxa-4,10-diazatetracyclo-[5.5.0.0$^{5,9}$0$^{3,11}$]-dodecane), nitramines such as RDX (1,3,5-trinitro-1,3,5-triaza-cyclohexane), HMX (1,3,5,7-tetranitro-1,3,5,7-tetraazacycloocatane), and HNIW (also known as CL-20) (2,4,6,8,10,12-hexanitro-2,4,6,8,10,12-hexaazatetracyclo[5.5.0.0$^{5,9}$0$^{3,11}$]dodecane); NTO (3-nitro-1,2,4-triazol-5-one); NQ (nitroguanidine); TATB (1,3,5-triamino-2,4,6-trinitobenzene); and DADNE (1,1-diamino-2,2-dinitro ethane).

PGN can also be used to prepare high solids (>90% explosive ingredient content) pressable or extrudable explosives. The pressable or extrudable explosives can also contain one or more inert and/or one or more energetic plasticizers. Representative inert plasticizers include DOA (dioctyladipate), IDP (isodecylperlargonate), DOP (dioctylphthalate), DOM (dioctylmaleate), DBP (dibutylphthalate), oleyl nitrile, or combinations thereof. Representative energetic plasticizers include BDNPF/BDNPA (bis(2,2-dinitropropyl)acetalibis(2,2-dinitropropyl) formal), TMETN (trimethylolethanetrinitrate), TEGDN (triethyleneglycoldinitrate), DEGDN (diethyleneglycoldinitrate), NG (nitroglycerin), BTTN (butanetrioltrinitrate), alkyl NENA's (nitratoethylnitramine), or mixtures thereof.

Exemplary curatives for some of the above-mentioned binders include isocyanates, and exemplary cure catalysts include Lewis acids, triphenylbismuth, alkyltin compounds, such as dibutyltindiluarate.

A list of representative ballistic modifiers include, by way of example, Lewis acids, iron oxide ($Fe_2O_3$), and lead and lead-containing compounds, such as lead salts and organometallic lead compounds.

The following examples are offered to further illustrate the synthesis methods of the present invention. These examples are intended to be exemplary and should not be viewed as a limitation on the claims.

EXAMPLES

Example 1
(Synthesis of glycidyl nitrate)

In a one-liter three-neck round bottom flask equipped with a magnetic stirrer, thermometer, additional funnel, and nitrogen sparge line was placed 140 grams of glycerine diluted with an equal volume of methylene chloride. The flask was immersed in a cooling bath. 300 ml of nitric acid (90%) was added while maintaining the temperature of the solution below 25° C. The mixture was allowed to stand with a vigorous nitrogen sparge for 4 to 18 hours. After 1 hr, the isomeric mixture of 1,2- and 1,3-dinitroglycerin accounted for 36.3 mol % of the mixture. This amount of isomeric mixture of dinitroglycerin increased to 39.0 mol % after 2 hours, 44.5 mol % after 4 hours, 71.5 mol % after 5 hours, and 73.8 mol % after 6 hours. 50% sodium hydroxide was then added while cooling to maintain the temperature of the mixture below 25° C. After the mixture was determined to be neutral, additional solid sodium hydroxide (one molar equivalent to the glycerine) was added slowly to maintain the temperature below 25° C. After stirring for 1 to 3 hours at room temperature, the mixture was extracted three times with ether, methylene chloride, or MTBE. The organic phases were combined, dried with magnesium sulfate, filtered and evaporated in vacuo, providing approximately 50 mol % of pure glycidyl nitrate.

Example 2
(Synthesis of glycidyl nitrate)

In a 300 milliliter three-neck round bottom flask equipped with a magnetic stirrer, thermometer, additional funnel, and nitrogen sparge line was placed 70 grams of glycerine (0.76 moles) diluted with 50 ml of methylene chloride. The flask was immersed in a cooling bath and cooled to 5° C. 150 ml of nitric acid (90%) was added dropwise over 30–45 minute period and then allowed to stir at room temperature for 5 to 6 hours. 30% NaOH solution was then added to the nitrated glycerol solution while cooling to maintain the temperature of the mixture below 25° C. After the mixture was determined to have a pH of 14, additional 30% NaOH solution in an amount of 275 grams was added slowly to maintain the temperature below 25° C. The mixture was allowed to stand for about 0.5 hour, then extracted three times with ether. The organic phases were combined, dried with magnesium sulfate, filtered and evaporated in vacuo, providing approximately 44 grams of pure glycidyl nitrate.

Example 3
(Synthesis of glycidyl nitrate)

In a 300 milliliter three-neck round bottom flask equipped with a magnetic stirrer, thermometer, additional funnel, and nitrogen sparge line was placed 70 grams of glycerine (0.76 moles) diluted with 50 ml of methylene chloride. The flask was immersed in a cooling bath and cooled to 0° C. 150 ml of 90 wt % nitric acid was added dropwise over a 45 minute period while maintaining the temperature of the nitrated glycerol solution below 10° C. The nitrated glycerol solution was allowed to stir overnight at a temperature of 15° C. A 50% NaOH solution was added to the nitrated glycerol solution slowly while maintaining the temperature below 25° C. until the reaction solution had a pH of 14. An additional 300 ml of 30% NaOH solution was added to the reaction solution, which was allowed to stir for 1 hour. The reaction solution was extracted three times with methylene chloride. The organic phases were combined, dried with magnesium sulfate, filtered and evaporated in vacuo, providing approximately 30.1 grams of pure glycidyl nitrate.

Example 4
(Synthesis of glycidyl nitrate)

In a 300 milliliter three-neck round bottom flask equipped with a magnetic stirrer, thermometer, additional funnel, and nitrogen sparge line was placed 70 grams of glycerine (0.76 moles) diluted with 50 ml of methylene chloride. The flask was immersed in a cooling bath and cooled to 0° C. 150 ml of 90 wt % nitric acid, prepurged for 30 minutes, was added dropwise over a 45 minute period while maintaining the temperature of the nitrated glycerol solution below 10° C. The nitrated glycerol solution was allowed to stir overnight at a temperature of 20° C. and a nitrogen purge. Thirty grams of solid NaOH was added to the nitrated glycerol solution over a period of 1 hour, then filtered. The reaction solution was extracted three times with methylene chloride. The organic phases were combined, dried with magnesium sulfate, filtered and evaporated in vacuo, providing approximately 42 grams of glycidyl nitrate.

Example 5
(Synthesis of glycidyl nitrate)

In a 300 milliliter three-neck round bottom flask equipped with a magnetic stirrer, thermometer, additional funnel, and nitrogen sparge line was placed 70 grams of glycerine (0.76 moles) diluted with 50 ml of methylene chloride. The flask was immersed in a cooling bath and cooled to 0° C. 170 ml of 90 wt % nitric acid was added dropwise over a 30 minute period while maintaining the temperature of the nitrated glycerol solution below 10° C. and purging the flask with nitrogen. The nitrated glycerol solution was allowed to stir overnight at a temperature of 20° C. and nitrogen purge. 210 gram solution of 50% NaOH solution was added to the nitrated glycerol solution slowly over the course of one hour while maintaining the temperature below 25° C. until the reaction solution had a pH of 14. After stirring for another 0.5 hours, an additional 50 grams of solid sodium hydroxide was added to the reaction solution, which was allowed to stir for 1 hour. The solid sodium hydroxide was then filtered off. The reaction solution was extracted three times with methylene chloride. The organic phases were combined, dried with magnesium sulfate, filtered and evaporated in vacuo, providing approximately 42.7 grams of glycidyl nitrate.

Example 6
(Synthesis of glycidyl nitrate)

Into a 50 ml 3-neck flask was placed 71.4 millimol (5.0 grams) of 90 wt % nitric acid and 79.4 millimol (5.0 grams) of 99 wt % nitric acid. The nitric acid was sparged in an ice bath with nitrogen for 45 minutes with 100 milligrams of urea as a $NO_x$ scavenger. 32.6 millimol (3.0 grams) of glycerin was added to acid at 10° C. and stirred at room temperature for 2 hours. Then, the solution was neutralized with 150.8 millimoles of 50 wt % KOH (9.94 grams of KOH) in an ice bath. An additional 75 grams of KOH solution (formed from 31 grams of solid KOH) was added portionwise at below 20° C. After the temperature stabilized at about 18° C., a yield of 56.5 wt % glycidyl nitrate was obtained.

Example 7
(Synthesis of glycidyl nitrate)

92 grams of glycerine and 100 ml of methylene chloride were stirred at 0° C. with air bubbling into the reaction mixture and 280 g of nitric acid added dropwise over 2.5 hr. After addition, the reaction was cooled to −4° C. and left for 16 hr. After this time a solution of 104 g of sodium hydroxide in 269 ml of water was added keeping the reaction temperature at 0° C. until the mixture was neutral. At this point addition wand stirring was stopped and two liquid phases separated. The aqueous phase was removed and the colorless organic phase was weighed (128 g) shown by nmr to be >90% purity dinitroglycerine with small amounts of trinitroglycerine, methylene chloride and mononitroglycerine. The organic phase was mixed with 65 ml of methylene chloride and an additional 282 g of 30% sodium hydroxide was added over 20 minutes keeping the reaction at 20–25° C. After addition, the reaction was stirred for an additional 10 minutes before the stirring was stopped and the two liquid phases allowed to separate. The organic phase was washed once with brine and dried with magnesium sulfate to give 75.3 g of glycidyl nitrate.

Example 8
(Polymerization of glycidyl nitrate to PGN)

0.189 grams (i.e., 0.186 ml or 2.1 mmol) of 1,4-butanediol and 0.1 grams (i.e., 2.3 mmol) of calcium hydride were stirred under nitrogen. 0.294 grams (i.e., 0.232 ml or 2.1 mmol) of $BF_3$ THF was added dropwise. After 1 hour, 10 grams (i.e., 84 mmol) of glycidyl nitrate (obtained from Example 3) and 10 ml of methylene chloride were added dropwise over three hours. An aliquot was removed and NMR analysis showed very little monomer. The reaction solution was quenched with brine (gassing from calcium hydride), washing with sodium bicarbonate and water, then dried by evaporation to give pure PGN as a very pale yellow viscous liquid. The yield was 8.5 grams, or about 85 wt % yield.

Example 9
(Polymerization of glycidyl nitrate to PGN)

1 gram of calcium hydride was stirred with 12.6 grams of butane diol under an argon atmosphere for 30 minutes at room temperature. The mixture was cooled to 10° C. and 6.37 grams of boron trifluoride:tetrahydrofuran complex was added. Stirring was continued for a further 30 minutes before a solution of 1000 grams of glycidyl nitrate (obtained from Examples 1–6) in 1000 grams of methylene chloride was added dropwise over 16 hours. After this time 2 liters of methylene chloride was added and the solution was filtered before being washed with 100 ml of saturated sodium chloride solution, then 200 ml of saturated sodium bicarbonate solution, then 200 ml of water. The methylene chloride was removed under vacuum and the crude polymer was then poured into 1 liter of methanol. The methanol was decanted from the polymer and the methanol wash repeated twice, following which the polymer was redissolved in methylene chloride, dried with magnesium sulfate, and filtered before the solvents were removed by evaporation at 50° C. under vacuum to yield 849 grams of amber colored viscous liquid polymer.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

We claim:

1. A method of synthesizing poly(glycidyl nitrate), said method comprising:

nitrating glycerol with at least one nitrating source to form a nitrated glycerol solution comprising dinitroglycerin;

treating the nitrated glycerol solution with at least one cyclizing agent to convert the dinitroglycerin into glycidyl nitrate; and polymerizing the glycidyl nitrate into poly(glycidyl nitrate).

2. A method of synthesizing poly(glycidyl nitrate), said method comprising:

nitrating glycerol with at least one nitrating source to form a nitrated glycerol solution comprising dinitroglycerin and nitroglycerin;

treating the nitrated glycerol solution with at least one cyclizing agent to convert the dinitroglycerin into glycidyl nitrate; and polymerizing the glycidyl nitrate into poly(glycidyl nitrate), wherein the nitroglycerin is not distilled or otherwise removed via vaporization from the nitrated glycerol solution or the reaction solution prior to said polymerization of the glycidyl nitrate.

3. The method of claim 2, wherein the nitrating source comprises nitric acid.

4. The method of claim 2, wherein the cyclizing agent comprises at least one alkali metal hydroxide selected from the group consisting of sodium hydroxide, potassium hydroxide, and lithium hydroxide.

5. The method of claim 2, wherein said nitrating is performed at not more than room temperature.

6. The method of claim 5, wherein said nitrating is performed at about 10° C. to about 20° C. in temperature.

7. The method of claim 2, wherein said nitrating and said treating of the nitrated glycerol solution are performed in at least one member selected from the group consisting of methylene chloride and dichloroethane.

8. The method of claim 2, wherein the nitrated glycerol solution further comprises mononitroglycerin, wherein said mononitroglycerin is hydrolyzed in said treating step, and wherein said method further comprises removing the hydrolyzed mononitroglycerin from the reaction solution prior to said polymerizing of the glycidyl nitrate.

9. The method of claim 2, wherein the glycerol is not distilled or otherwise subjected to vaporization temperatures prior to said nitrating thereof.

10. A method of synthesizing an explosive or propulsive formulation comprising poly(glycidyl nitrate), said method comprising:

nitrating glycerol with at least one nitrating source to form a nitrated glycerol solution comprising dinitroglycerin and nitroglycerin;

treating the nitrated glycerol solution with at least one cyclizing agent to convert the dinitroglycerin into glycidyl nitrate;

polymerizing the glycidyl nitrate into the poly(glycidyl nitrate); and combining the poly(glycidyl nitrate) with at least one oxidizer to form the explosive or propulsive formulation, wherein the nitroglycerin is not distilled or otherwise removed via vaporization from the nitrated glycerol solution or the reaction solution prior to said polymerization of the glycidyl nitrate.

11. The method of claim 10, wherein the oxidizer comprises at least one member selected from the group consisting of ammonium perchlorate, ammonium nitrate, hydroxylammonium nitrate, ammonium dinitramide, and hydrazinium nitroformate.

12. The method of claim 10, further comprising combining the poly(glycidyl nitrate) with at least one metal fuel.

13. The method of claim 12, wherein the metal fuel comprises at least one member selected from the group consisting of aluminum, magnesium, boron, titanium, and zirconium.

14. The method of claim 10, further comprising combining the poly(glycidyl nitrate) with at least one binder.

15. The method of claim 14, wherein the binder comprises at least one member selected from the group consisting of hydroxy-terminated polybutadiene, butadiene-acrylonitrile-acrylic acid terpolymer, polypropylene glycol, polyethylene glycol, polyesters, polyacrylates, polymethacrylates, cellulose acetate butyrate, and copolymers thereof.

16. The method of claim 14, wherein the binder comprises at least one member selected from the group consisting of poly(nitratomethyl-methyloxetane), polyglycidyl azide, diethyleneglycol-triethyleneglycol-nitraminodiacetic acid terpolymer, poly(bisazidomethyloxetane), poly(azidomethyl-methyloxetane).

17. The method of claim 10, further comprising combining the poly(glycidyl nitrate) with at least one member selected from the group consisting of 4,10-dinitro-2,6,8,12-tetraoxa-4,10-diazatetracyclo[$5.5.0.0^{5,9}0^{3,11}$]-dodecane, 1,3,5-trinitro-1,3,5-triaza-cyclohexane, 1,3,5,7-tetranitro-1,3,5,7-tetraaza-cyclooctane, NTO 3-nitro-1,2,4-triazol-5-one, nitroguanidine, 2,4,6,8,10,12-hexanitro-2,4,6,8,10,12-hexaazatetracyclo-[$5.5.0.0^{5,9}0^{3,11}$]dodecane), 1,3,5-triamino-2,4,6-trinitobenzene, and 1,1-diamino-2,2-dinitro ethane.

18. The method of claim 10, further comprising combining the poly(glycidyl nitrate) with at least one plasticizer selected from the group consisting of dioctyladipate, isodecylperlargonate, dioctylphthalate, dioctylmaleate, dibutylphthalate, and oleyl nitrile.

19. The method of claim 10, further comprising combining the poly(glycidyl nitrate) with at least one plasticizer selected from the group consisting of bis(2,2-dinitropropyl)acetal/bis(2,2-dinitropropyl)formal, trimethylolethanetrinitrate, triethyleneglycoldinitrate, diethyleneglycol-dinitrate, nitroglycerin, butanetrioltrinitrate, and nitratoethylnitramine.

* * * * *